(12) United States Patent
Wang (10) Patent No.: US 12,195,343 B2
(45) Date of Patent: Jan. 14, 2025

(54) SYNTHESIS OF JANUS NANOMATERIALS (71) Applicant: Saudi Arabian Oil Company, Dhahran (SA)

(72) Inventor: Wei Wang, Quincy, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/106,342

(22) Filed: Feb. 6, 2023

(65) Prior Publication Data

US 2023/0183077 A1   Jun. 15, 2023

Related U.S. Application Data

(62) Division of application No. 16/653,367, filed on Oct. 15, 2019, now Pat. No. 11,572,282.

(51) Int. Cl.
  *C01B 33/12* (2006.01)
(52) U.S. Cl.
  CPC .................... *C01B 33/12* (2013.01)
(58) Field of Classification Search
  None
  See application file for complete search history.

(56) References Cited

U.S. PATENT DOCUMENTS

| | | |
|---|---|---|
| 6,638,885 B1 | 10/2003 | McGrath et al. |
| 7,875,654 B2 | 1/2011 | Hong et al. |
| 2010/0305219 A1 | 12/2010 | Granick et al. |
| 2015/0218921 A1 | 8/2015 | Suresh et al. |

FOREIGN PATENT DOCUMENTS

WO   2017210424   12/2017

OTHER PUBLICATIONS

PCT International Search Report and Written Opinion in International Appln. No. PCT/US2020/055521, dated Feb. 11, 2021, 15 pages.
SAIP Examination Report in Saudi Arabian Appln. No. 522432252, dated Mar. 30, 2023, 16 pages.
Chen et al., "Synthesis of ordered lamellar supermicroporous silica with rigid neutral and long-chain cationic composite templating route," Plos One, Apr. 2019, 14(4): 3-5, 13 pages.
Constantin and Davidson, "Lamellar Lα Mesophases doped with inorganic nanoparticles," Chemical Phs. Chem. vol. 15, 1270-1282, 2014, 12 pages.
He et al., "One-pot Facile Synthesis of Janus Particles with Tailored Shape and Functionality," Electronic Supplementary Material (ESI) for Chemical Communications, The Royal Society of Chemistry, 2011, 17 pages.
Hu et al., "Fabrication, properties and applications of Janus particles," Chem. Soc. Rev. vol. 41, No. 11, pp. 4356-4378, 2012, Feb. 2012, 23 pages.
Liang et al., "Inorganic janus nanosheets," Angewandte Chemie, 2011, 10(123), 2427-2430, 4 pages.

(Continued)

*Primary Examiner* — Michael Forrest
(74) *Attorney, Agent, or Firm* — Fish & Richardson P.C.

(57) ABSTRACT

Synthesizing Janus nanoparticles including forming a lamellar phase having water layers, organic layers, and a surfactant, and reacting chemical precursors in the lamellar phase to form the Janus nanoparticles at interfaces of the water layers with the organic layers.

9 Claims, 7 Drawing Sheets (56) References Cited

OTHER PUBLICATIONS

Liang et al., "Janus hollow spheres by emulsion interfacial self-assembled sol-gel process," Chemical Communications, Jan. 2011, 47(4): 1231-1233, 3 pages.
Luo et al., "Nanofluid of graphene-based amphiphilic Janus Nanosheets for tertiary or enhanced oil recovery: high performance at low concentration," Proceedings of the National Academy of Sciences of USA, PNAS, vol. 113, No. 28, Jul. 12, 2016, 17 pages.
Meyre et al (Radiation-Induced Synthesis of Gold Nanoparticles within Lamellar Phases. Formation of Aligned Colloidal Gold by Radiolysis, Langmuir, vol. 24. No 9, 2008, 4421-4425.
Peng et al., "A review of nanomaterials for nanofluid enhanced oil and recovery," Royal Society of Chemistry, Jun. 13, 2017, 9 pages.
Perro et al., Production of large quantities of "Janus" nanoparticles using wax-in-water emulsions, Colloids and Surfaces A: Physicochem. Eng. Aspects 332, 2009, 57-62.
Walther et al., "Janus Particles: Synthesis, Self-Assembly, Physical Properties and Applications, " Chem. Rev. vol. 113, No. 7, pp. 5194-5261, Apr. 2013, 68 pages.
Wang et al., "Stepwise interfacial self-assembly of nanoparticles via specific DNA pairing", Phys. Chem. Chem. Phys., 2007, 9, 6313-6318.

SYNTHESIS OF JANUS NANOMATERIALS

CROSS REFERENCE TO RELATED APPLICATION

This application is a divisional of and claims priority to U.S. patent application Ser. No. 16/653,367, filed on Oct. 15, 2019, the entire contents of which is incorporated by reference herein.

TECHNICAL FIELD

This disclosure relates to Janus nanomaterials, such as Janus nanoparticles.

BACKGROUND

Janus particles are types of nanoparticles with at least two surfaces having different respective physical properties. This surface arrangement of Janus nanoparticles allows two different types of chemistry to occur on the same particle. This surface configuration gives properties related to the asymmetric structure or asymmetric functionalization of the particles. The synthesis of Janus nanoparticles generally relies on selectively creating each side of a nanometer-sized particle with different chemical properties. Example syntheses of Janus nanoparticles include masking, self-assembly, and phase separation. Janus nanoparticles have generally been produced in the laboratory in small quantities, such as less than 100 milligrams (mg) in a day. Such syntheses typically employ multiple-step reactions.

SUMMARY

An aspect relates to a method of synthesizing Janus nanoparticles. The method includes forming a lamellar phase having water layers, organic layers, and a surfactant. The method includes reacting chemical precursors in the lamellar phase to form Janus nanoparticles at interfaces of the water layers with the organic layers.

Another aspect relates to a method of synthesizing Janus nanoparticles. The method includes forming a lamellar phase having a surfactant, water layers, and organic layers. The method includes incorporating a first chemical reagent in the water layers and incorporating a second chemical reagent in the organic layers. The method includes allowing the first chemical reagent to react with the second chemical reagent at interfaces of the water layers with the organic layers to form Janus nanoparticles at the interfaces.

Yet another aspect relates to a method of synthesizing Janus nanomaterial. The method includes forming a lamellar phase having a surfactant, water layers, organic layers, and chemical precursors. The method includes allowing the chemical precursors to react to form Janus nanoparticles at interfaces between the organic layers and the water layers.

Yet another aspect relates to a lamellar phase having surfactant, water layers with a water-soluble organometallic compound, and oil layers with an oil-soluble organometallic compound. The lamellar phase has Janus metal-oxide nanoparticles formed from reaction of the water-soluble organometallic compound with the oil-soluble organometallic compound at the interfaces of the water layers with the oil layers. The Janus metal-oxide nanoparticles are disposed at the interfaces.

The details of one or more implementations are set forth in the accompanying drawings and the description later.

Other features and advantages will be apparent from the description and drawings, and from the claims.

BRIEF DESCRIPTION OF DRAWINGS

Like reference numbers and designations in the various drawings indicate like elements.

DETAILED DESCRIPTION

In some implementations, a Janus nanoparticle may be formed by dividing a nanoparticle into two distinct parts each of a different respective material or bearing different functional groups. For example, a Janus nanoparticle may have one-half of its surface composed of hydrophilic groups and the other half hydrophobic groups. This may impart properties related to the asymmetric structure or functionalization of the Janus nanoparticle. The synthesis of Janus nanoparticles may rely on selectively forming each side of a nanometer-sized particle with different chemical properties.

Janus particles in nanoscale (or submicron scale) may be unique among nanoscale materials because Janus particles provide asymmetry. The Janus particles are asymmetric. The Janus particles via their asymmetry can impart different chemical or physical properties and directionality within a single particle. The broken symmetry may provide for targeting self-assembled materials and realizing properties unavailable with homogeneous particles or symmetric patchy particles. Janus nanoparticles may have distinct properties.

Janus nanoparticles have generally not been manufactured in industrial-scale quantities. Janus nanoparticles have been synthesized at the laboratory research scale. Embodiments of the present techniques synthesize Janus nanomaterials at larger than research scale, such as greater than one kilogram (kg) in a day. Therefore, Janus nanomaterials may be produced at commercial scale for supply in applications across several industries. One example of an application is in the oil industry in which Janus nanoparticles, such as Janus ceramic nanoparticles or Janus silica nanoparticles, are utilized in nanofluid flooding in enhanced oil recovery (EOR). Aspects of the present techniques may provide for mass production of Janus nanomaterials or Janus nanoparticle materials for industrial application.

The synthesis or a portion of the synthesis of the Janus nanoparticles may be a one-pot synthesis. In chemistry, a one-pot synthesis may be that chemical reactions occur in one reactor. This may be desirable in avoiding separation and purification of intermediate chemical compounds and thus save time and resources.

The present disclosure relates to the high-throughput bulk synthesis (for example, greater than 1 kilogram per day) of Janus nanomaterials. Some aspects are directed to the high-throughput bulk synthesis of Janus ceramic nanoparticles or Janus silica nanoparticles. A one-pot synthesis or one-pot mass synthesis of the Janus nanoparticles (for example, ceramic or silica) may be implemented.

The Janus ceramic particles synthesized may be Janus metal-oxide nanoparticles, such as Janus silicon-dioxide ($SiO_2$) nanoparticles, Janus titanium-dioxide ($TiO_2$) nanoparticles, Janus zirconium-dioxide ($ZrO_2$) nanoparticles, Janus aluminum (III)-oxide ($Al_2O_3$) nanoparticles, Janus iron (III)-oxide ($Fe_2O_3$) nanoparticles, Janus zinc-oxide (ZnO) nanoparticles, Janus tin-dioxide ($SnO_2$) nanoparticles, or Janus gallium (III)-oxide ($Ga_2O_3$) nanoparticles. The Janus metal-oxide nanoparticles can be Janus rare-earth metal-oxide nanoparticles, such as Janus cerium (IV)-oxide ($CeO_2$) nanoparticles, gadolinium (III)-oxide ($Gd_2O_3$) nanoparticles, europium (III)-oxide ($Eu_2O_3$) nanoparticles, or terbium (III)-oxide ($Tb_2O_3$) nanoparticles.

Embodiments synthesize Janus ceramic nanoparticles at mass quantity through one-pot reactions in a liquid-crystal lamellar phase. The liquid-crystal lamellar-phase medium may consist of surfactant, water, and organic compound(s) (for example, oil) to generate layered organic-water interfaces. The organic-water interfaces may be generated at intervals, for example, of about 10 nanometers (nm). Each organic-water interface (interfacial unit) can serve as an interfacial nanoreactor that provides interfacial reaction area for the reactions that form the Janus nanoparticles.

In implementations, chemical precursors are mixed in an organic phase solution or an aqueous phase solution. Then, the two solutions are mixed at controlled surfactant-water-organic ratios to form the liquid-crystal lamellar phase. Chemical reactions may occur upon mixing the precursors from the two phases. When the reactions are complete or near completion, Janus nanoparticles with one side hydrophilic and another side hydrophobic may be formed. Certain functional groups on the Janus nanoparticles, such as the amine functional group —$NH_2$ and thiol functional group —SH, reserve opportunities for further functionalization that may be pursued depending on needs for various applications. Some embodiments are the direct formation of Janus nanoparticles without need for a post-synthesis surface functionalization. The direct formation may produce the Janus nanoparticles in quantities for industrial application.

A particular microstructure of interest is the organic lyotropic liquid crystal with long-range periodically structural order (the so-called lamellar (Lα) phase) formed in part by a surfactant or mixtures of a surfactant and a co-surfactant in solvents. The lamellar phase consists of stacks of periodic molecular bilayer sheets separated by layers of solvents. By adding a solvents, such as water and an organic (for example, oil), the bilayer separation (d, lamellar periodicity) in the lyotropic lamellar phases can be swollen from one nanometer to tens of nanometer. A graphic illustration of the lamellar phase is displayed in FIG. 1.

Embodiments employ a lyotropic liquid-crystal phase as a template to produce Janus nanomaterials. The liquid-crystal phase medium may include surfactant, water, and an organic compound (oil) to generate layered organic-water interfaces with intervals in nanometers, such as approximately 10 nm. The repeating organic-water interfaces can amplify the interfacial area significantly by at least about a million times (for example, at about $10^6$ order) in comparison to conventional bi-phase solution techniques. The present embodiments can perform interfacial reactions and facilitate production of the Janus nanosheets in quantities for industrial application.

Lamellar phase may refer generally to packing of polar-headed long chain nonpolar-tail molecules as sheets of bilayers separated by bulk polar liquid. As mentioned, a particular microstructure for certain embodiments is the organic lyotropic liquid-crystal with periodically structural order. This microstructure may be labeled as the lamellar (Lα) phase or smectic A mesophase and formed in solvents (for example, water and organic compounds) with a surfactant or mixtures of surfactant and cosurfactant. The surfactant may be nonionic, anionic, cationic, or zwitterionic. The lamellar phase may consist of stacks of periodic molecular bilayer-sheets separated by layers of solvents. By adding solvents, such as water and an organic compound (for example, oil), the bilayer separation (for example, d-spacing or d, lamellar periodicity) in the lyotropic lamellar phases can be increased from a nanometer to tens of nanometer.

A liquid crystalline mesophase may be called lyotropic if formed by dissolving an amphiphilic mesogen in a solvent under specified conditions of concentration, temperature, and pressure. In contrast to thermotropic liquid crystals, lyotropics liquid crystals have an additional degree of freedom in the concentration that enables them to induce a variety of different phases. As the concentration of amphiphilic molecules is increased, several different type of lyotropic liquid crystal structures occur in solution, and the lamellar phase may be formed. This lamellar phase is denoted by the symbol Lα and can be considered the lyotropic equivalent of a smectic A mesophase. The lamellar phase may consist of amphiphilic molecules arranged in bilayer sheets separated by layers of water. A mesophase may be a state of matter intermediate between liquid and solid. Gelatin is a common example of a partially-ordered structure in a mesophase.

Surfactants may be compounds that reduce the surface tension or interfacial tension between two liquids, between a gas and a liquid, or between a liquid and a solid. With respect to the surfactants, the term "nonionic" may mean not ionic, not anionic, not cationic, and not zwitterionic. For a detergent, nonionic may mean that the detergent does not dissociate into ions in aqueous solution. A nonionic surfactant may have covalently bonded oxygen-containing hydrophilic groups, which are bonded to hydrophobic parent structures. The water-solubility of the oxygen groups may be the result of hydrogen bonding. Hydrogen bonding generally decreases with increasing temperature, and the water solubility of nonionic surfactants therefore decreases with increasing temperature.

Figure 1:
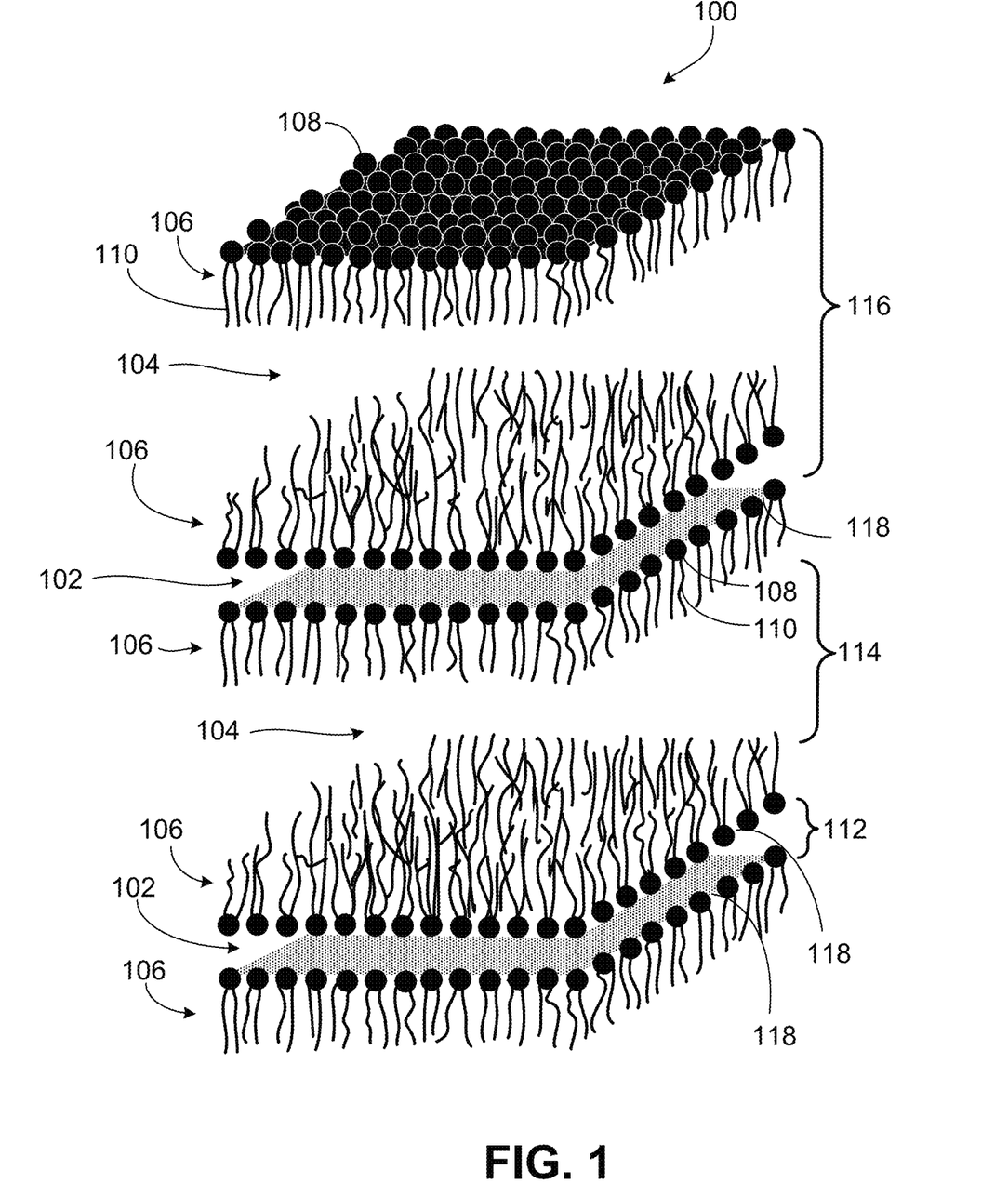
FIG. 1 is a diagram of a liquid-crystal lamellar phase having a water phase (water layers) and an organic phase (organic layers).

FIG. 1 is a liquid-crystal lamellar phase 100 having a water phase (water layers 102) and an organic phase (organic layers 104). The lamellar phase 100 has alternating water layers 102 and organic layers 104. The lamellar phase 100 includes a surfactant 106. See FIG. 3 for examples of surfactants that may be utilized as the surfactant 106. The multiple lyotropic liquid crystals of the lamellar phase 100 are the surfactant 106 molecules each having a hydrophilic head 108 and a hydrophobic tail 110 in the illustrated implementation. For clarity in the two water layers having the reference numeral 102, only some of the hydrophilic heads 108 are depicted.

In some embodiments, the lamellar phase 100 may be prepared by dissolving a surfactant 106 (with or without a cosurfactant) into water and then adding an organic solvent (for example, oil or diesel) under agitation. The surfactant 106 can be a nonionic surfactant, a cationic surfactant, an anionic surfactant, or a zwitterionic surfactant. The surfactant 106 can be a mixture of a surfactant and a cosurfactant.

The water layers 102 may be characterized as water phase layers 102. The water layers 102 may be more generally an aqueous layer or hydrophilic layer. The water layers 102 may include ground water, treated water (for example, demineralized water), or formation water. The water layers 102 may include components other than water such as dissolved solids. The water layers 102 as an aqueous layer may include chemical components soluble in water. The water layers 102 have a thickness 112.

The organic layers 104 may be characterized as organic phase layers 104. The organic phase or organic layers 104 may be oil, such as mineral oil, refined oil, crude oil, fractions of crude oil, diesel, synthetic oil, or vegetable oil. The organic layers 104 may be, for example, heptane, octane, decane, dodecane, or diesel. The organic layers 104 are generally hydrophobic. The organic layers have a thickness 114.

As mentioned for the illustrated embodiment, the surfactant 106 molecules each have a hydrophilic molecular head 108 and a hydrophobic molecular tail 110. The lamellar phase 100 may typically be a planar structure with surfactant hydrophilic heads 108 contacting water layers 102 and surfactant hydrophobic tails 110 contacting the organic phase layers 104 in the illustrated implementation. In implementations, the lamellar phase 110 is generally not a micelle or emulsion.

In some instances, the organic layer 104 and water layer 102 may each be labeled as a lamellar layer. While the combination of the organic layer 104 and the water layer 102 (and with their interface) may instead be labeled as the lamellar layer, this combination is typically instead labeled as a lamellar unit 116 (d-spacing) as depicted. The lamellar unit 116 may include an organic layer 104, a water layer 102, the organic-water interface 118, and the surfactant 106. The surfactant hydrophilic heads 108 are on the water side of the interface 118. The surfactant hydrophobic tails 110 are on the organic side of the interface 118. The repeating lamellar unit 116 may have a thickness, for example, in a range of 5 nm to 100 nm. In certain embodiments, each lamellar unit 116 may be a nanoreactor.

Embodiments employ the lamellae as template media to produce Janus nanoparticles. The lamellar phase 100 can generate alternating interfaces of water and organic layers on the nanoscale range. The many lamellar units 116 may each be utilized respectively as a nanoreactor for chemical reactions at the water-organic interfaces 118. The chemical reaction can be controllably-run occurring either at the water phase side or the organic phase side of the interface 118, or both sides of the interface 118. Employing these nanoreactors may provide to functionalize sides (surfaces) of the nanoparticles, producing Janus nanoparticles with one side hydrophilic and the other side hydrophobic. These nanoreactors may also be utilized to directly form the Janus nanoparticles via reaction of chemical precursors at the interface 118 without subjecting the surface of the nanoparticles to surface treatment, surface modification, or surface functionalization.

The lamellar phase 100 gives many water-organic interfaces 118 with each lamellar unit 116 being a respective lamellar nanoreactor. The lamellar phase 100 may have up to a million lamellar units 116 or more depending on the amount of surfactant and solution capacity. In the lamellar phase 100, most or all of the chemical reagents added to the lamellar phase 100 may be confined in thin layers of solvents (organic layers 104 and water layers 102) near the interfaces 118. Therefore, chemical reactions may be more effective than in a bi-phase system having a single interface. In implementations, the chemical reactions in the lamellar phase 100 incorporate greater than 90 weight percent of the chemical reagents (chemical precursors) added to the lamellar phase 100.

The lamellar phase 100 may provide for formation of Janus nanoparticles at the organic-water interfaces 118 in the lamellar phase 100. As discussed, the alternating organic layers 104 and water layers 102 form a repeating organic-water interface 118. These repeating organic-water interfaces may provide for repeating nanoreactors. Each lamellar unit 116 may include a single organic layer 104, a single water layer 102, the associated single organic-water interface 118, and the associated surfactant 106 molecules having the hydrophilic heads 108 and hydrophobic tails 110. The lamellar phase 100 may have at least one million lamellar units 116. Thus, there may be at least one million nanoreactors in the lamellar phase 100. In one implementation, the lamellar phase 100 has at least 100,000 lamellar units 116, which may give a corresponding at least 100,000 nanoreactors.

For the lamellar phase 100, the lamellar periodicity (d) may vary from several nanometers to several tens of nanometers by changing thickness of the organic (for example, oil) layers 104 or the water layers 102, or both. This lamellar periodicity may be measured, for example, by small-angle x-ray scattering (SAXS) measurement or small-angle neutron scattering (SANS) measurement. The thickness of the water layers 102 in the lamellar phase 100 may be, for example, in the range of 5 nm to 10 nm. The thickness of the water layers 102 may be less than 50 nm, or less than 25 nm. The thickness of the organic layers 104 in the lamellar phase 100 may be, for example, in the range of 2 nm to 15 nm. The thickness of the organic layers 104 may be less than 50 nm, less than 30 nm, or less than 25 nm.

Embodiments may provide for the direct formation Janus nanoparticles in the lamellar template media. The lamellar phase 100 can generate organic-water interfaces 118 on the nanoscale range. Each lamellar unit 116 can be utilized as an interfacial nanoreactor for chemical reactions at the organic-water interface 118. Chemical precursors (chemical reagents) dissolved in the water phase 102 and oil phase 104, respectively, can meet at organic-water interface 118. Therefore, chemical reactions occur at or near the organic-water interface 118 for nanoparticle formation. The hydrophobic components of the precursors prefer to stay at the oil phase side. The hydrophilic components of the precursors prefer to stay at the water phase side. Thus, the reactions from both hydrophilic and hydrophobic components at the interface may result in the direct formation Janus nanoparticles. A schematic illustration of Janus nanoparticle formation in the lamellar nanoreactors is shown in FIG. 2.

Figure 2:
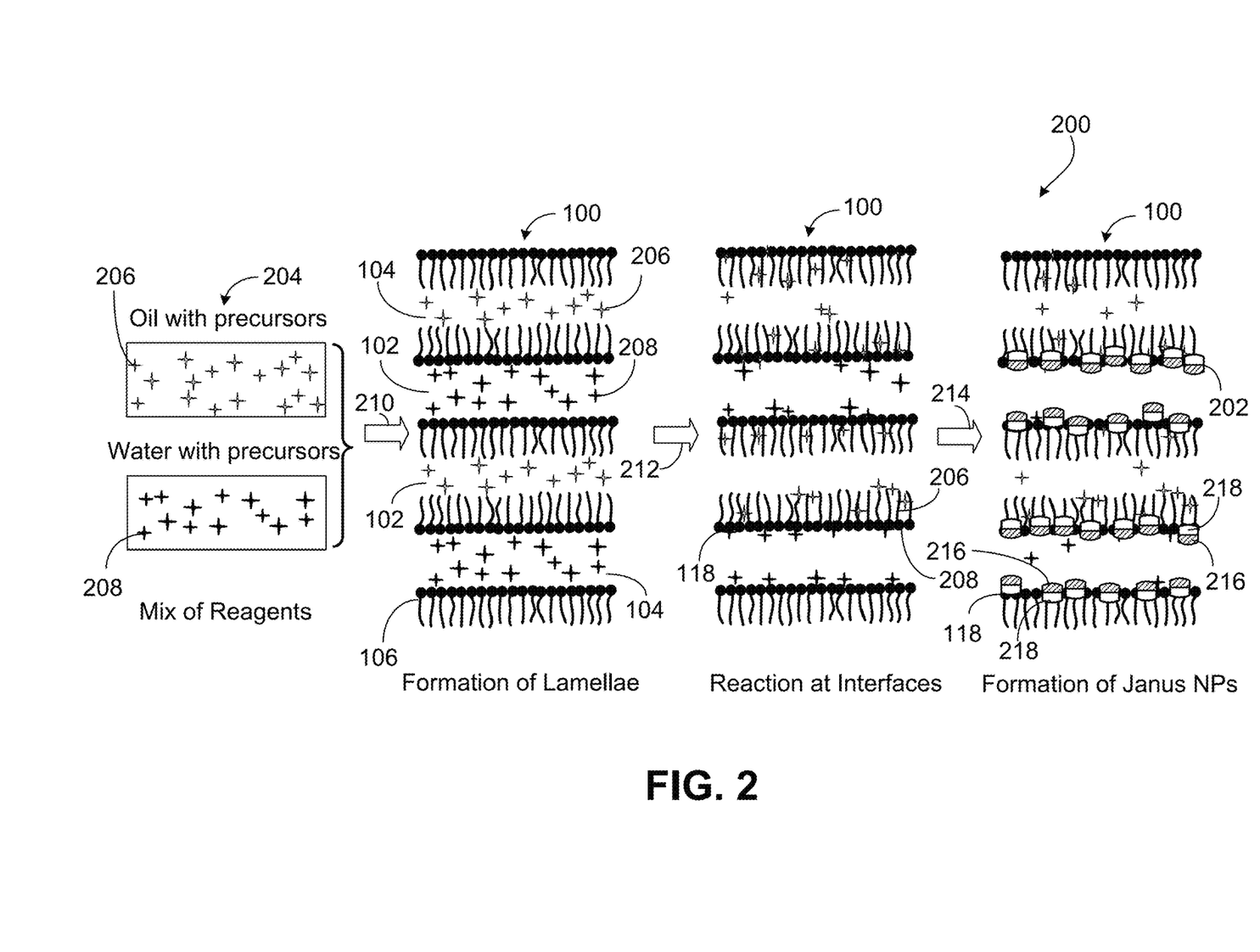
FIG. 2 is a sequence diagram of a lamellar phase in the synthesis of Janus nanoparticles.

FIG. 2 is a sequence diagram 200 of a lamellar phase 100 in the formation of Janus nanoparticles 202. Components mixed to form the lamellar phase 100 include water, an organic compound (for example, oil), and surfactant 106. As discussed with respect to FIG. 1, the lamellar phase 100 includes alternating water layers 102 and organic layers 104. As depicted in FIG. 2, chemical reagents 204 may be added to the lamellar phase 100.

The chemical reagents 204 include chemical precursors 206 for the organic phase and chemical precursors 208 for the water phase. The chemical precursors 206 may be labeled as hydrophobic precursors. The chemical precursors 208 may be labeled as hydrophilic precursors. In some implementations, the hydrophobic precursors 206 may be organic-soluble (or oil-soluble) organometallic compounds and the hydrophilic precursors 208 may be water-soluble organometallic compounds. Solubility may be affected by saturation conditions of the lamellar phase 100. In embodiments, at least 99 weight percent of the organic-soluble precursors 206 added may dissolve in the organic phase (layers 104) of the lamellar phase 100. At least 99 weight percent of the water-soluble precursors 208 may dissolve in the water phase (layers 102) of the lamellar phase 100.

In certain implementations, the chemical precursors 206 and 208 may be incorporated in an organic compound (for example, oil) and water, respectively, prior to addition to the lamellar phase 100. As referenced by arrow 210, the chemical precursors 206, 208 may be added with the organic compound and water contemporaneous with the formation of the lamellar phase 100 or may be added after formation of lamellar phase 100.

As referenced by arrow 212, the chemical precursors 206, 208 migrate toward the organic-water interfaces 118 where chemical reactions occur. A catalyst may be added to the lamellar phase 100 to accelerate the reactions. An example of a catalyst is ammonium hydroxide, tetramethylammonium hydroxide, hydrogen chloride, or acetic acid.

As referenced by arrow 214, Janus nanoparticles 202 are formed at the organic-water interfaces 118 via the reaction of the chemical precursors 206 with the chemical precursors 208 at the organic-water interfaces 118. In this implementation, the Janus nanoparticles 202 have a hydrophilic side 216 and a hydrophobic side 218. The Janus nanoparticles 202 may straddle the interface 118. The hydrophilic side 216 may reside in a water layer 102. The hydrophobic side 218 may reside in an oil layer 104. The Janus nanoparticles 202 directly formed may be Janus metal-oxide nanoparticles.

In the syntheses of Janus nanoparticles 212, such as Janus $SiO_2$ nanoparticles, Janus $TiO_2$ nanoparticles, or Janus $ZrO_2$ nanoparticles, the hydrophilic precursors 208 may include water-soluble organometallic compounds. Examples include tetraalkyl orthosilicate (alkyl is methyl or ethyl), tetraalkyl orthotitanate (alkyl is ethyl, propyl, isopropyl, butyl, or tert-butyl), and tetrapropyl zirconate (alkyl isethyl, propyl, isopropyl, butyl, or tert-butyl). These organometallic compounds can react with water to form metal oxide nanoparticles in aqueous phase (water layers 102) with or without a catalyst, as depicted in equations [1], [2], and [3]:

$$Si(OC_nH_{2n+1})_4 + H_2O \rightarrow SiO_2 + C_nH_{2n+1}OH, (n=1,2,3,4) \quad [1]$$

$$Ti(OC_nH_{2n+1})_4 + H_2O \rightarrow TiO_2 + C_nH_{2n+1}OH, (n=1,2,3,4) \quad [2]$$

$$Zr(OC_nH_{2n+1})_4 + H_2O \rightarrow ZrO_2 + C_nH_{2n+1}OH, (n=1,2,3,4) \quad [3]$$

In the syntheses of Janus metal-oxide nanoparticles (for example, Janus $SiO_2$ nanoparticles, Janus $TiO_2$ nanoparticles, or Janus $ZrO_2$ nanoparticles), examples of the hydrophobic precursors 206 may include oil-soluble organometallic compounds, such as n-alkyltriethoxysilane (alkyl is hexyl, octyl, decyl, dodecyl, tetradecyl, hexadecyl, or octadecyl), perfluoroalkyl-1H,1H,2H,2H-triethoxysilane (alkyl is hexyl, decyl, or octylphenyl), aminoalkyltriethoxysilane (alkyl=undecyl or octadecyl), and phenylalkyltrimethoxysilane, (alkyl is ethyl, propyl, or butyl). These organometallic compounds can reach an organic-water interface 118 and hydrolyze with water to form a thin layer on the metal-oxide nanoparticles while hydrophobic tails of these precursors 206 remain in the organic-phase side (in the organic layer 104) at the organic-water interface 118.

Figure 4:
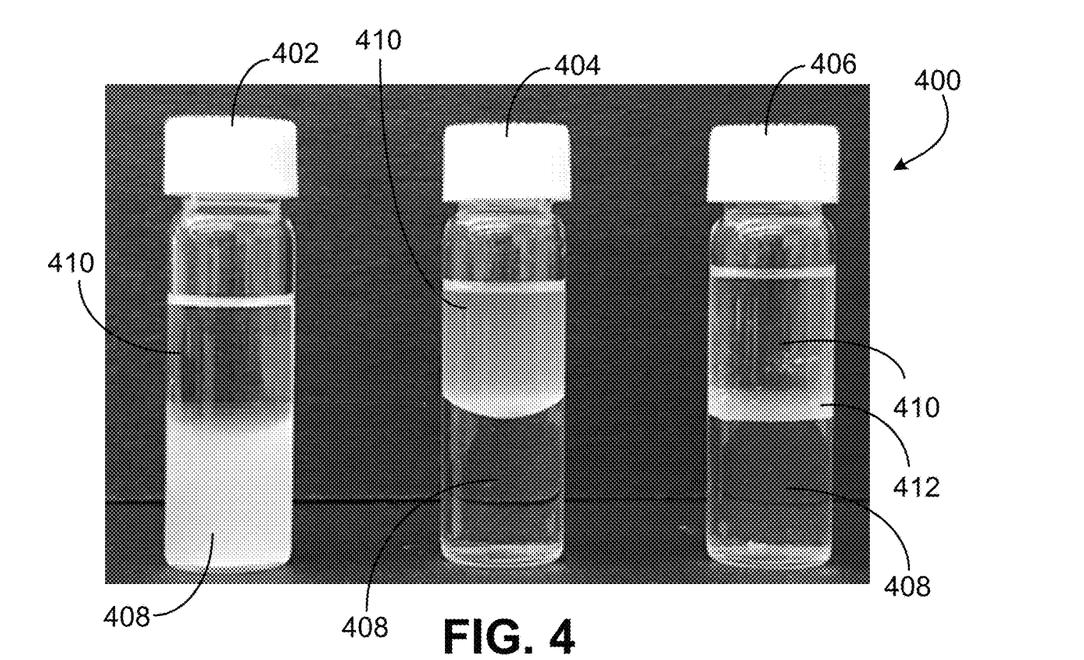
FIG. 4 is an image of three vials each having different respective nanoparticles in hexane and water.

Synergetic effects of the reaction on the water side (water layer 102) of the interface 118 with the reaction on the organic side (organic layer 104) of the interface 118 can result in formation of metal-oxide nanoparticles 212 with Janus structure. Exemplary photos of nanoparticles 212 as synthesized $SiO_2$ nanoparticles with different surface properties are shown in FIG. 4. The asymmetric surface property of the Janus nanoparticles (in this instance, one side hydrophilic and another side hydrophobic) makes the Janus nanoparticles tend to aggregate at the water-organic interface 118.

Figure 3:
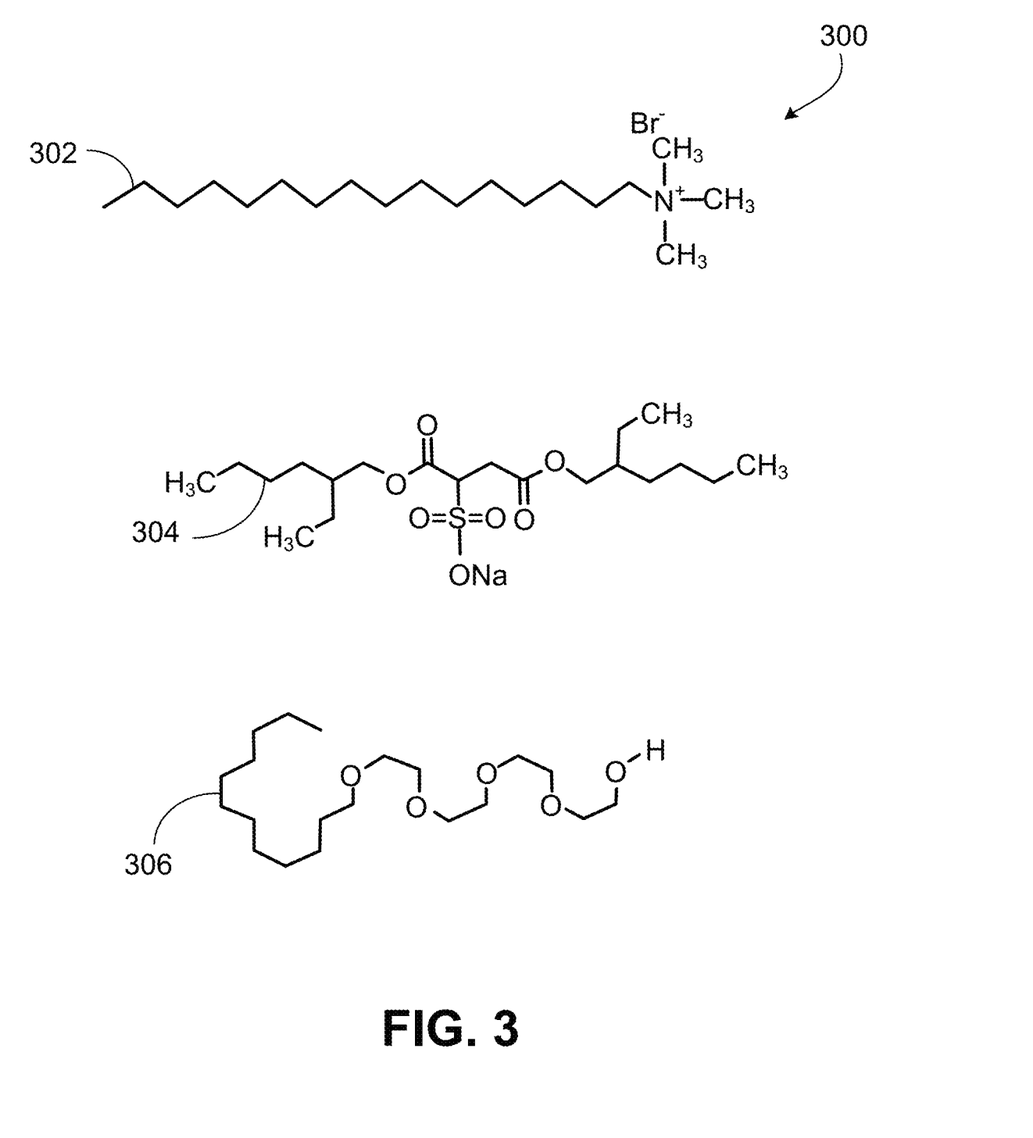
FIG. 3 is a diagram giving exemplary surfactants utilized to form the lamellar phase.

FIG. 3 gives exemplary surfactants 300 utilized to form the lamellar phase. The surfactants 300 to build the lamellar phase nanoreactors can be cationic, anionic, or nonionic. An example of a cationic surfactant is cetyltrimethylammonium bromide (CTAB) 302. An example of an anionic surfactant is dioctyl sulfosuccinate sodium (AOT) 304. An example of a nonionic surfactant ispolyoxyethylene (4) lauryl ether (Brij® 30) 308. In the growth of the Janus nanoparticles, a cationic surfactant can attract the forming nanoparticles (for example, ceramic nanoparticles) from the water phase to the water-organic interface via negative surface charges. However, nonionic and anionic surfactants may instead be employed.

EXAMPLES

The Examples formed Janus $SiO_2$ nanoparticles. As discussed, the organic phase can be, for example, decane, dodecane, mineral oil, diesel, or crude oil. To facilitate characterization, decane was employed as the organic phase in the laboratory in the syntheses in the Examples. Diesel or crude oil as the organic layers may be utilized in the scale-up synthesis for commercial-scale application.

Example 1

A first mixture was prepared by mixing (dissolving) the cationic surfactant CTAB and the hydrophilic precursor tetraethoxysilane (TEOS) in water. A second mixture was prepared by dissolving the hydrophobic precursor aminoundecyltriethoxysilane in decane. The first mixture and the second mixture were combined with a vertex mixer to form a generally uniform lamellar phase. Ammonium hydroxide as catalyst was added to the formed lamellar phase to accelerate the reaction. The chemical reactions in the lamellar phase occurred at room temperate for 12 hours without stirring. Upon the completion of the chemical reactions (at 12 hours of reaction), the lamellar phase was disabled by adding isopropanol. The formed Janus $SiO_2$ nanoparticles were collected by centrifuge and then washed by ethanol, acetone, and water in turn. Then, some of the Janus $SiO_2$ nanoparticles collected and washed were placed in a vial 406, as depicted in FIG. 4.

FIG. 4 is an image 400 of three vials 402, 404, and 406 each having different respective nanoparticles in hexane 410 and water 408. The first vial 402 has hydrophilic pristine nanoparticles. As can be seen by the lack of clarity in the water phase 408 in the first vial 402, the hydrophilic nanoparticles dispersed into the water phase. The second vial 404 has hydrophobic surface-functionalized nanoparticles. As can be seen by the lack of clarity in the hexane phase 410 in the second vial 404, the hydrophobic nanoparticles dispersed into the hexane phase 410. The third vial 406 has the Janus structure $SiO_2$ nanoparticles synthesized in Example 1. As can be seen by the lack of clarity at the water-hexane interface 412 in the third vial 406, the Janus structure $SiO_2$ nanoparticles (formed in Example 1) migrated to the water-hexane interface 412.

The described synthesis in Example 1 was repeated multiple times with the shape of the formed Janus structure $SiO_2$ nanoparticles controlled through the reactions. At less concentration of precursors in the water phase, the formed Janus nanoparticles had spherical shape. At greater concentration of the precursors in the water phase, the formed nanoparticles tended to be rod-like shape. Morphology of the synthesized $SiO_2$ nanoparticles formed in lamellar template media were characterized by scanning electron microscope (SEM).

Figure 5:
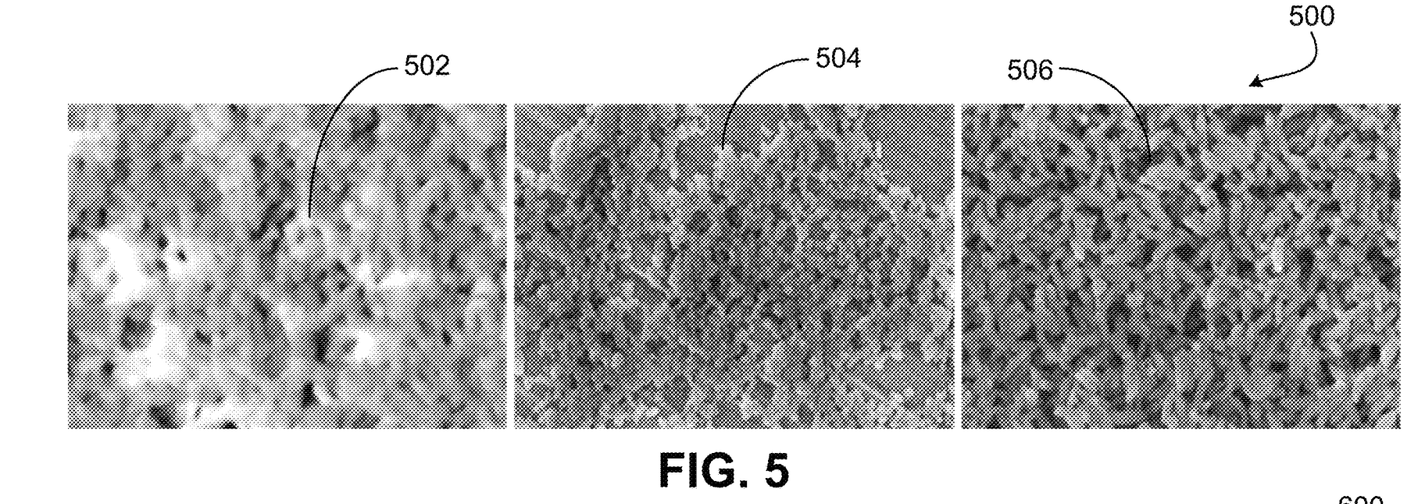
FIG. 5 is scanning electron microscope (SEM) images of Janus silicon-dioxide ($SiO_2$) nanoparticles.

FIG. 5 are SEM images 500 of Janus $SiO_2$ nanoparticles 502, 504, and 506 synthesized in Example 1 as having different respective shapes (controllable morphologies). The images 500 show that sizes of the Janus $SiO_2$ nanoparticles 502, 504, and 506 are at nanometer scale. The primary Janus $SiO_2$ nanoparticles 502 are generally spherical at a diameter of about 10-20 nm. The Janus $SiO_2$ nanoparticles 504 are also generally spherical but at a diameter of about 30-50 nm. Lastly, the Janus $SiO_2$ nanoparticles 506 are rod-like (cylindrical) with a diameter of about 30 nm and a length of about 200 nm.

Figure 6:
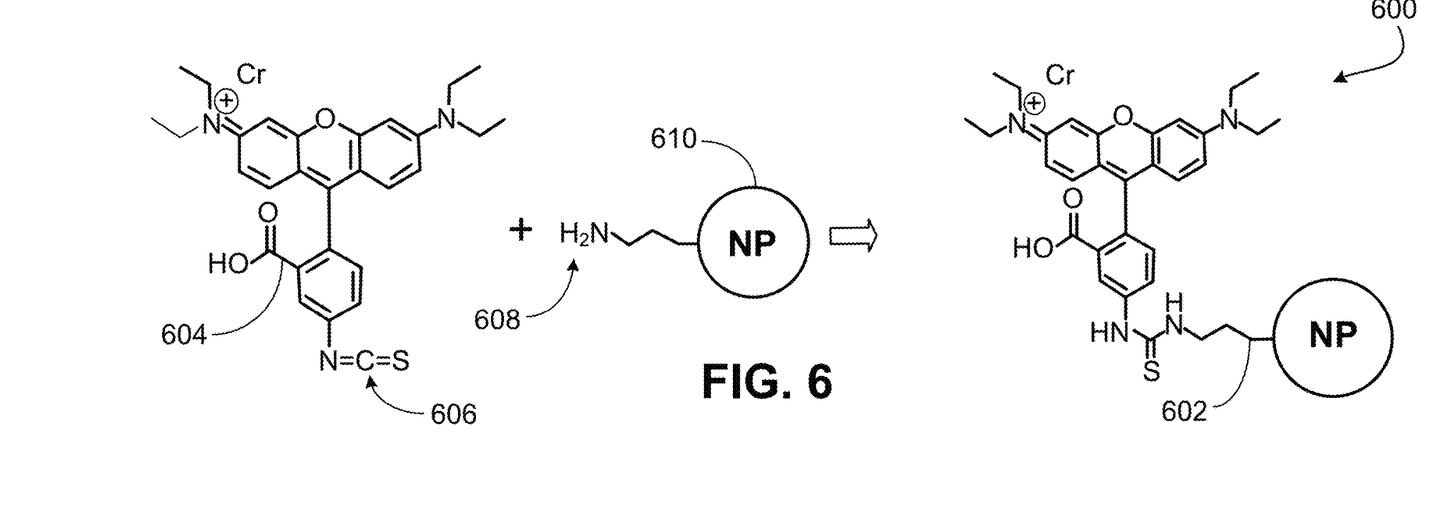
FIG. 6 is a diagram of a reaction giving formation of an isothiocyanate-amine complex.

FIG. 6 is a diagram of a reaction 600 giving formation of an isothiocyanate-amine complex 602. A dye molecule, such as Rhodamine B isothiocyanate (RhBITC) 604, having an isothiocyanate reactive group ($-N=C=S$) 606, is reactive towards a primary amine group ($-NH_2$) 608 of a surface-modified nanoparticle 610 to form a stable fluorescent complex, such as the isothiocyanate-amine complex 602. The $-NH_2$ 608 may be a hydrophobic group or a hydrophilic group. In view of the reaction 600, RhBITC 604 was utilized to confirm that the $SiO_2$ nanoparticles formed in Example 1 had a Janus structure.

To confirm that $SiO_2$ nanoparticles formed in Example 1 had a Janus structure, the $SiO_2$ nanoparticles were mono-facial modified with hydrophobic undecylamino groups ($-C_{11}H_{23}-NH_2$) to give a primary amine group ($-NH_2$) 608 on the hydrophobic side of the $SiO_2$ nanoparticles. The "modification" to give the surface amine group 608 occurred directly in the formation of the $SiO_2$ nanoparticles via the reaction of the precursors. These mono-facial modified $SiO_2$ nanoparticles were dispersed in a water-hexane biphase mixture. The mono-facial modified $SiO_2$ nanoparticles stayed as a thin layer at the water-hexane interface.

A dye solution having RhBITC 604 was injected into the water phase of the water-hexane bi-phase mixture. Then, after 2 hours, the dyed water phase was replaced with water not having the dye solution. The mono-facial modified $SiO_2$ nanoparticles at the water-hexane interface had no noticeable change in the mixture with or without the dye solution. This behavior (see also FIG. 7) indicates that there was no reaction 600 of the RhBITC 604 dye molecules (in the water phase) with the modified $SiO_2$ nanoparticles at the hexane-water interface. The hydrophobic undecylamino groups (having the $-NH_2$) on the modified surface of the mono-facial modified $SiO_2$ nanoparticles did not reach the RhBITC 604 dye molecules (in the water phase) and therefore no reaction 600 occurred. The plain surface (not having the hydrophobic $-NH_2$ group) of the mono-facial modified $SiO_2$ nanoparticles was on the water side of the hexane-water interface.

Example 2

To further confirm that $SiO_2$ nanoparticles synthesized in present implementations have a Janus structure, additional $SiO_2$ nanoparticles were synthesized and the $-NH_2$ group 608 placed on the hydrophilic surface of the $SiO_2$ nanoparticles. Thus, these $SiO_2$ nanoparticles synthesized in Example 2 were surface modified (directly in formation) to have a hydrophilic $-NH_2$ group.

The $SiO_2$ nanoparticles in Example 2 were synthesized as follows. A first mixture was prepared by mixing (dissolving) the nonionic surfactant CTAB and the hydrophilic precursors TEOS and (3-aminopropyl)triethoxysilane (APTES) in water. A second mixture was prepared by dissolving the hydrophobic precursor octodecyltriethoxysilane in dodecane. The first mixture and the second mixture were combined with a vertex mixer to form a generally uniform lamellar phase. Ammonium hydroxide as catalyst was added to the mixture to accelerate the reaction that formed the Janus $SiO_2$ nanoparticles at the interface of the dodecane and the water.

In their formation via the reaction of the precursors, these $SiO_2$ nanoparticles in Example 2 were altered to be mono-facial modified $SiO_2$ nanoparticles. A hydrophilic compound having the propylamine ($-C_3H_7-NH_2$) group was added to modify (functionalize) the hydrophilic surface of the nanoparticles with the $-C_3H_7-NH_2$ group so that the nanoparticles would have a $-NH_2$ group 608 that is hydrophilic (on the hydrophilic side of the nanoparticles). A hydrophobic compound having the octadecyl ($-C_{17}H_{35}-CH_3$) group was added to modify (functionalize) the hydrophobic surface of the nanoparticles with the $C_{17}H_{35}-CH_3$ group. These Janus $SiO_2$ nanoparticles in Example 2 as surface modified were collected and dispersed in a water-hexane biphase mixture. The mono-facial modified $SiO_2$ nanoparticles stayed as a thin layer at the water-hexane interface.

A dye solution having RhBITC 604 was injected into the water phase of the water-hexane bi-phase mixture. The hexane-water interface turned fluorescence (see also FIG. 7) during the injecting of the RhBITC 604 solution into the water phase, implying that the RhBITC molecules reacted (bonded) with the hydrophilic $-NH_2$ groups of the Janus $SiO_2$ nanoparticles from the water phase side. The hydrophilic ($-C_3H_7-NH_2$) group having the $-NH_2$ on the modified surface of the mono-facial modified $SiO_2$ nanoparticles interacted with the RhBITC 604 dye molecules (in the water phase) and therefore the reaction 600 occurred. The plain surface (hydrophobic and not having the $-NH_2$ group) of the mono-facial modified $SiO_2$ nanoparticles was on the hexane side of the hexane-water interface.

The aforementioned use of the RhBITC 604 solution in Example 1 and Example 2 revealed the asymmetric properties of the $SiO_2$ nanoparticles and confirmed their Janus structure. This use of the RhBITC 604 solution in Example 1 and Example 2 was repeated in a chloroform-water bi-phase mixture having dye RhBITC 604 in the water phase, as indicated in FIG. 7.

Figure 7:
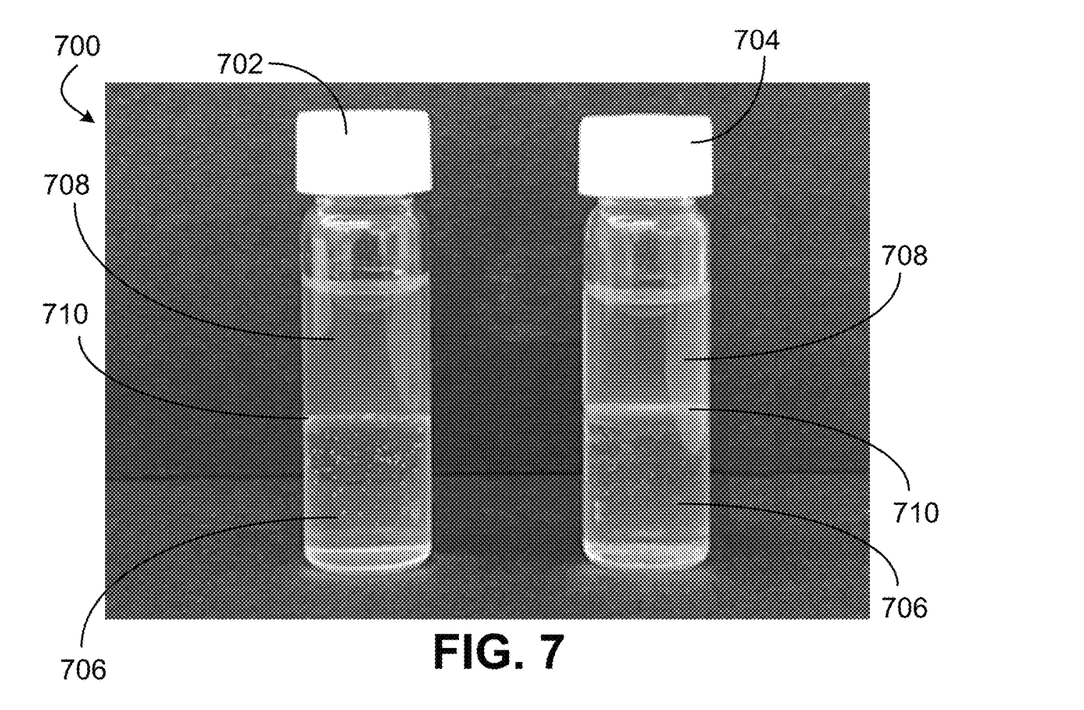
FIG. 7 is an image of two vials each having Janus $SiO_2$ nanoparticles in a bi-phase mixture of chloroform and water.

FIG. 7 is an image 700 of two vials 702, 704 each having a bi-phase mixture of chloroform 706 and water 708. The water 708 phase includes the dye RhBITC 604 (see FIG. 6). The bi-phase mixture in the first vial 702 has the Janus $SiO_2$ nanoparticles of Example 1 with the hydrophobic $-NH_2$ group. The bi-phase mixture in the second vial 704 has the Janus SiO$_2$ nanoparticles of Example 2 with the hydrophilic —NH$_2$ group. The Janus SiO$_2$ nanoparticles in each vial 702 and 704 generally reside at the water-chloroform interface 710.

As can be seen in FIG. 7, the dye RhBITC 604 in the first vial 702 is dispersed through the water 708 phase, indicating that the RhBITC 604 did not react (bond) with the nanoparticles in the first vial 702. The reaction 600 (see FIG. 6) did not occur in the first vial 702. This was expected because the —NH$_2$ group was on the hydrophobic side of the nanoparticles facing the chloroform 706 phase in the first vial 702. In contrast, the dye RhBITC 604 in the second vial 704 is seen as not dispersed through the water 708 phase but concentrated onto the Janus nanoparticles at the interface, indicating that the RhBITC 604 reacted (bonded) (reaction 600) with the nanoparticles at the water-chloroform interface 710 in the second vial 704. This was expected because the —NH$_2$ group was on the hydrophilic side of the nanoparticles facing the water 708 phase in the second vial 704. The image 700 of the two vials 702, 704 having the described respective mixtures confirm that the SiO$_2$ nanoparticles are asymmetric and have a Janus structure.

Figure 8:
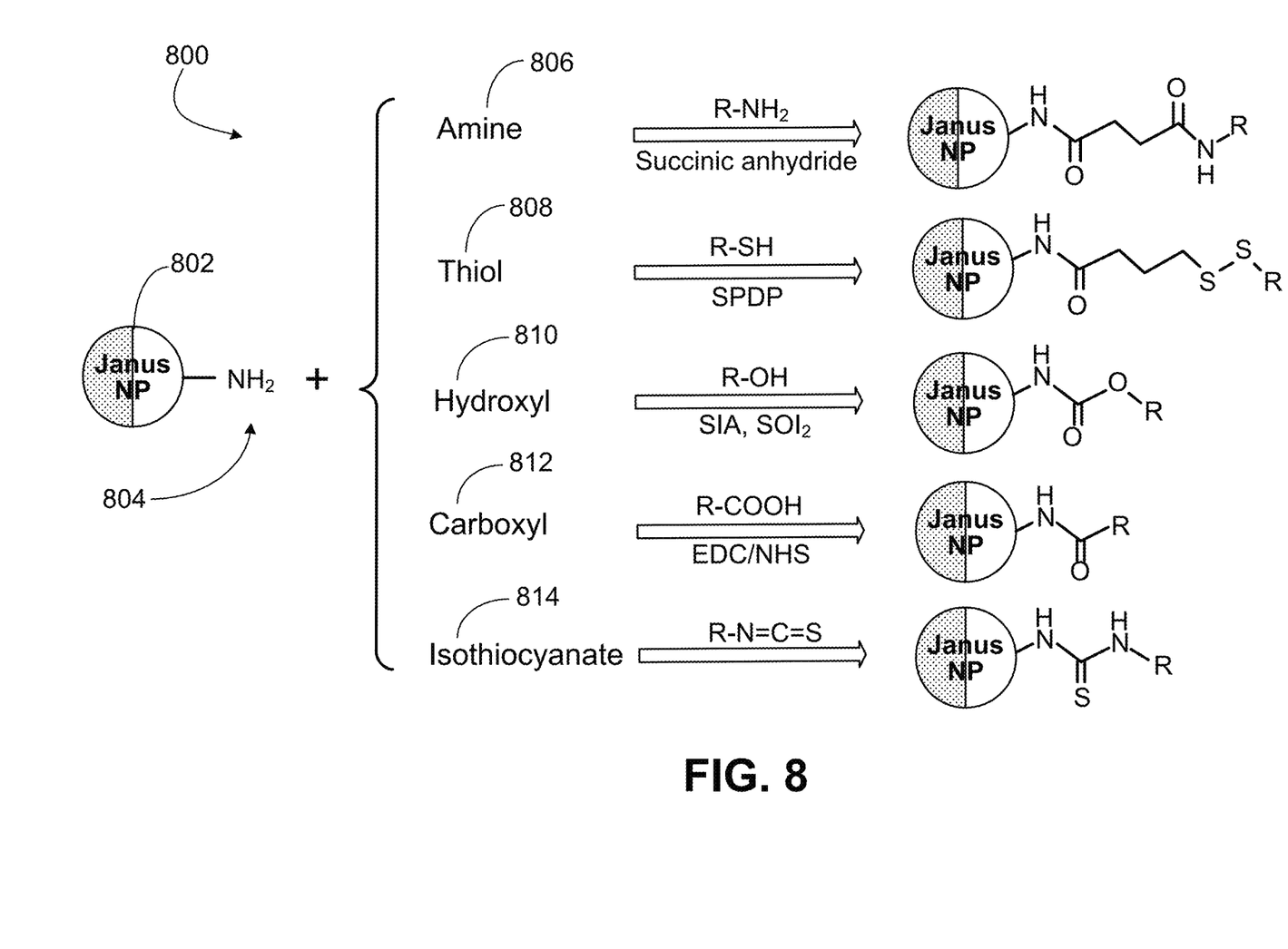
FIG. 8 is a diagram depicting exemplary reactions that may further functionalize the Janus nanoparticles.

Instead of the dye molecules, different functional molecules can be grafted to one side of the Janus nanoparticles, as noted in FIG. 8. The Janus nanoparticles may be Janus metal-oxide nanoparticles. The attachment of functional molecules to the Janus nanoparticle can extend applicability of the Janus nanoparticles to multiple industries, such as applications in sensing and biomedical materials.

FIG. 8 is a diagram 800 depicting exemplary reactions that may further functionalize the Janus nanoparticles 802. In these implementations, the Janus nanoparticles 802 have a functional group, such as an amine —NH$_2$ group 804, on one side for the functionalization reaction to occur. The —NH$_2$ group 804 may be on the hydrophobic side of the Janus nanoparticles 802 or on the hydrophilic side of the Janus nanoparticles 802.

The further functionalization of the Janus nanoparticles 802 with different functional groups may provide for applicability of the Janus nanoparticles in a range of applications. The conjugation schemes give attachment of molecules (R) onto the amine-coated surface of the Janus nanoparticles 802. The molecules may include biomolecules. The molecules (R) are attached to the nanoparticle surface on the side of the Janus nanoparticle 802 having the amine coating (having the —NH$_2$ group 804). The molecules (R) each have and present a target site (a functional group) for interaction or reaction with the amine group 804 on the nanoparticle 802 to attach or graft the molecule (R) to the surface of the nanoparticle 802. The target sites (functional groups) may include, for example, an amine 806, a thiol 808, a hydroxyl 810, a carboxyl 812, and an isothiocyanate 814. Exemplary reagents in the reactions may include 1-ethyl-3-(3-dimethylaminopropyl) carbodiimide hydrochloride (EDC), succinimidyl ester (NHS), succinimidyliodoacetate (SIA), N-succinimidyl 3-(2-pyridyldithio) propionate (SPDP), succinic anhydride, and thionyl chloride (SOCl$_2$).

Langmuir-Blodgett technology was employed to examine interfacial properties of the Janus nanoparticles. When injecting a suspension of Janus SiO$_2$ nanoparticles suspension into a water-hexane mixture, a nanoparticle monolayer forms at the water-hexane interface. In applying lateral pressure to compress the nanoparticle monolayer, the surface pressure ($\pi$) can reach 20 millinewton per meter (mN/m) or greater, further confirming the formation of a stable Janus structure.

The Janus nanoparticles have an effect on a water-organic interface. When injecting a suspension Janus nanoparticles into a water-organic mixture, the interfacial tension at the water-oil interface can be altered, as indicated in FIG. 9.

Figure 9:
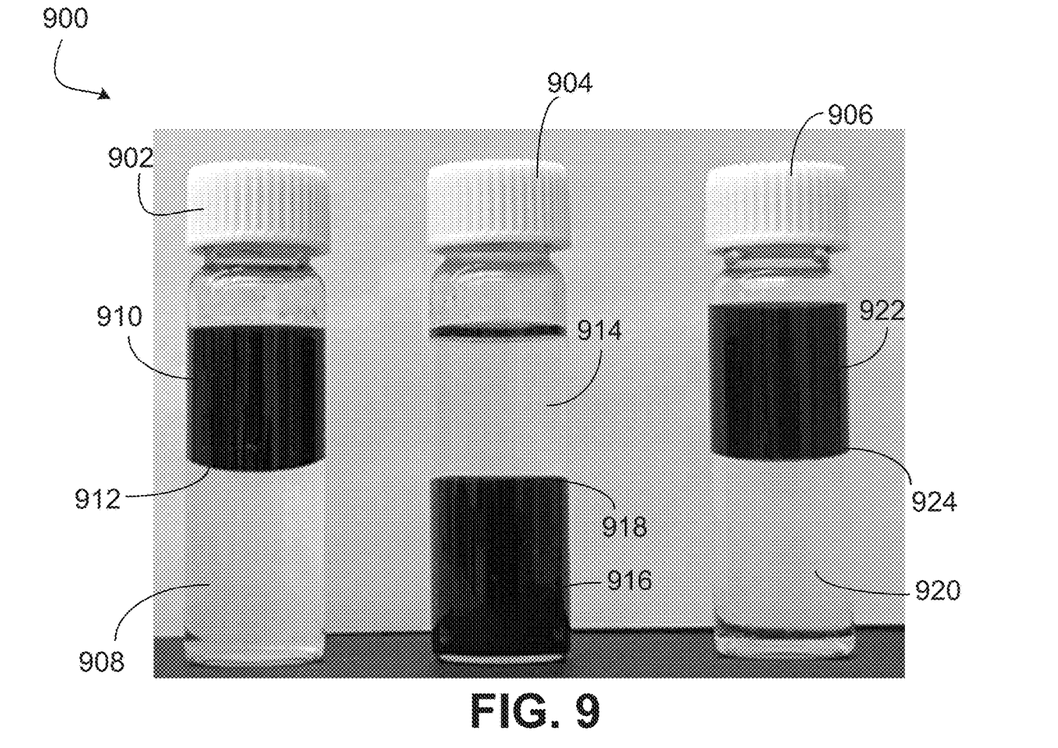
FIG. 9 is an image of three vials each having water and crude oil.

FIG. 9 is an image 900 of three vials 902, 904, and 906. The first vial 902 has water 908 and crude oil 910 to depict a plain interface 912 of the water 908 and crude oil 910. No nanoparticles are included in the bi-phase mixture in the first vial 902. The second vial 904 has water 914 and a combination of crude oil and chloroform as the organic phase 916. The bi-phase mixture in the second vial 904 includes Janus SiO$_2$ nanoparticles. The water-organic interface 918 in the second vial 904 is more flat than the interface 912 in the first vial 902. The third vial 906 has water 920 and crude oil 922. The bi-phase mixture in the third vial 906 includes Janus SiO$_2$ nanoparticles. The water-crude oil interface 924 in the third vial 906 is more flat than the water-crude oil interface 912 in the first vial 902.

Embodiments provide for a one-pot synthesis of Janus ceramic (metal oxide) nanoparticles at greater than one kilogram per day. The Janus metal-oxide nanoparticles can alter interfacial properties of water-organic (oil) interfaces. Implementations may provide for direct formation of Janus nanoparticles through a one-pot reaction at interfacial nanoreactors. The interfacial nanoreactors may be composed of lyotropic liquid-crystal lamellar phase for the synthesis. The chemical reaction routes for the ceramic nanoparticles formation may be through hydrolysis of organometallic compounds at the interfacial nanoreactors. Janus nanoparticles production in lyotropic liquid-crystal lamellar phase was demonstrated in the Examples. Structural and property characterizations on the synthesized Janus nanomaterials were performed.

Implementations include equipment, operating conditions, and production rate in commercial systems to produce these Janus metal-oxide nanoparticles at industrial scale. In embodiments, the chemical reactions occur at ambient temperature and atmosphere pressure. The quantity of product in one-batch reaction may depend on the volume of the reaction vessel. The scale can be amplified from lab scale in milliliters to intermediate scale at liters and industrial scale at tens or hundreds of liters.

Embodiments provide synthesizing millions of Janus nanoparticles in a single batch in a vessel. The technique may be at industrial scale and for a range of applications of Janus nanoparticles in various industries. The Janus nanoparticles can alter interfacial properties of water-oil interfaces. The Janus nanoparticles may have application in a nanoagent solution for enhanced oil recovery (EOR) in oil and gas recovery applications.

Embodiments employ lyotropic liquid crystal phase as a template for Janus nanoparticle synthesis and with efficiency of interfacial reactions by a million times (at 106 order) compared with bi-phase reactions. Such promotes and facilitate bulk Janus nanosheets production feasible for industrial applications. The nanoreactor utilizes a lyotropic liquid crystal phase as template media for chemical reactions at water-oil interfaces. A chemical reaction route is implemented to fabricate Janus nanoparticles in mass or bulk quantities and also to functionalize the Janus nanoparticles. The structure and properties of the synthesized Janus nanoparticles may be evaluated. Functionalized Janus nanoparticles may be characterized. Microfluidic imaging of the Janus nanoparticles may be performed for EOR applications.

Figure 10:
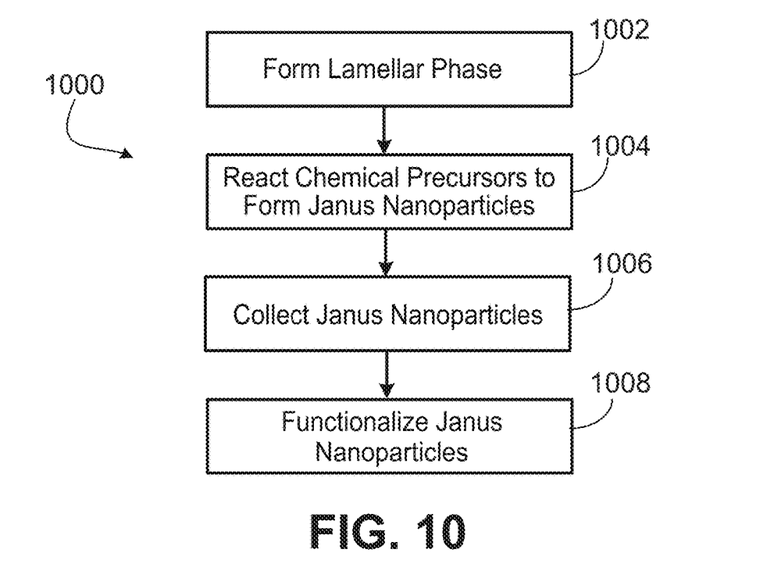
FIG. 10 is a block flow diagram of a method of synthesizing Janus nanoparticles.

FIG. 10 is a method 1000 of synthesizing Janus material, such as Janus nanomaterial or Janus nanoparticles. The Janus material is synthesized in a lamellar media or lamellar phase. The synthesis of the Janus nanoparticles may be performed in a vessel, such as in a batch operation. Semi-batch or continuous operations may be employed.

At block 1002, the method includes forming or providing a lamellar phase having water layers and organic layers. The lamellar phase may typically include a surfactant. A surfactant may organize at a liquid-liquid boundary which can lead to an organized interface and liquid-crystal phases. The surfactant may be a nonionic surfactant, a cationic surfactant, an anionic surfactant, or a zwitterionic surfactant. In certain implementations, hydrophilic molecular heads of the surfactant contact the water layers and hydrophobic molecular tails of the surfactant contact the organic layers. For a surfactant molecule, the molecule may have a hydrophilic head contacting a water layer and a hydrophobic tail contacting an organic layer adjacent the water layer. The lamellar phase may additionally include a cosurfactant. A cosurfactant may be a chemical utilized with a surfactant to improve performance or enhance effectiveness of the surfactant. An example of a cosurfactant is an alcohol having at least 5 carbons.

The water layers may be characterized as water phase layers. Likewise, the organic layers may be characterized as organic phase layers. The organic phase may be an oil phase and thus the organic layers may be oil layers. The lamellar phase may include at least 100,000 water layers and at least 100,000 organic layers. The water layers may alternate with the organic layers. The water layers may each have a thickness of up to about 50 nm. The organic layers may each have a thickness of up to about 50 nm. In certain embodiments, the lamellar phase is placed or formed in the same vessel in which the synthesis (for example, batch synthesis) of the Janus nanoparticles occurs.

The lamellar phase also includes chemical precursors (chemical reagents). The chemical precursors may be added to or incorporated in the lamellar phase after the lamellar phase is formed. The chemical precursors may be incorporated in the lamellar phase as the lamellar phase is being formed. The chemical precursors may be added contemporaneous with the formation of the lamellar phase. The chemical precursors may be included in the water and organic compound prior to mixing of the water, organic compound, and surfactant that forms the lamellar phase. Examples of the chemical precursors include organometallic compounds.

At block 1004, the method includes reacting the chemical precursors in the lamellar phase to form Janus nanoparticles at interfaces of the water layers with the organic layers. The method may include allowing the chemical precursors to migrate to the interfaces where reactions between chemical reagents occur. The forming (block 1002) of the lamellar phase and reacting (block 1004) of the chemical precursors may to form the Janus nanoparticles may be performed in the same vessel as a one-pot synthesis.

The Janus nanoparticles may be Janus ceramic nanoparticles or Janus metal-oxide nanoparticles. The Janus metal-oxide nanoparticles may be, for example, Janus $SiO_2$ nanoparticles, Janus $TiO_2$ nanoparticles, or Janus $ZrO_2$ nanoparticles. The Janus nanoparticles may have a hydrophobic surface and a hydrophilic surface. At the interfaces, a hydrophilic surface or hydrophilic portion of the Janus nanoparticles may reside in the water layers. A hydrophobic surface or hydrophobic portion of the Janus nanoparticles may reside in the respective organic layer adjacent the water layer.

The reacting of chemical precursors may include reacting at the interfaces a water-soluble chemical precursor (reagent) incorporated in the water layers with an organic-soluble chemical precursor (reagent) incorporated in the organic layers. The water-soluble chemical precursor may be, for example, a water-soluble organometallic compound. The organic-soluble precursor may be, for example, an oil-soluble organometallic compound.

The reacting of the chemical precursors may give a surface functional group, such as an alkyl group ($—C_nH_{2n+1}$ $CH_3$ group), an amine group ($—NH_2$ group), a thiol group ($—SH$ group), a carboxyl group ($—COOH$ group) or an isothiolcyanate group ($—NCS$ group) on a surface of the Janus nanoparticles. The chemical precursors may include the functional group that becomes the surface functional group. The water-soluble precursor may have a functional group that becomes a functional group on a hydrophilic portion of the Janus nanoparticles. If so, the water-soluble precursor reacting with the organic-soluble precursor gives the functional group as a surface functional group on a hydrophilic side of the Janus nanoparticles. The organic-soluble precursor may have a functional group that becomes a functional group on a hydrophobic portion of the Janus nanoparticles. In these implementations, the organic-soluble precursor reacting with the water-soluble precursor gives the functional group as a surface functional group on a hydrophobic side of the Janus nanoparticles.

The surface functional group (whether on a hydrophilic surface or hydrophobic surface, or both) of the Janus nanoparticles may be, for example, an amine ($—NH2$) group or thiol ($—SH$) group. A purpose of the surface functional group may be for further functionalization of the Janus nanoparticles, as discussed with respect to block 1008.

At block 1006, the method includes collecting the Janus nanoparticles from the lamellar phase. For instance, the method may include centrifuging the lamellar phase to separate the Janus nanoparticles from the lamellar phase for collection. The collected Janus nanoparticles may be washed with water or a hydrocarbon.

At block 1008, the method includes reacting a molecule functional group of molecules with a surface functional group (for example, discussed in block 1004) in presence of a reagent to attach the molecule to a surface of the Janus nanoparticles. In other words, the method may include reacting a compound functional group of a compound with the surface functional group to attach the compound to the hydrophilic side of the Janus nanoparticles or to the hydrophobic side of the Janus nanoparticles, or both sides. The compound or molecule functional group may be an amine group, a thiol group, a hydroxyl group, a carboxyl group, or an isothiocyanate group, or any combinations thereof. The reagent may include EDC, NHS, SIA, SPDP, succinic anhydride, or $SOCl_2$, or any combinations thereof.

An embodiment is a nanoreactor that includes an interface between a water layer of a lamellar phase and an organic layer (for example, oil layer) of the lamellar phase. The lamellar phase includes a surfactant. The nanoreactor may be characterized as including the water layer and the organic layer. The nanoreactor may be characterized as the lamellar unit including the water layer, organic layer, and water-organic interface. The nanoreactor includes Janus metal-oxide nanoparticles as product formed at the interface from chemical precursors in the lamellar phase. The chemical precursors include a water-soluble organometallic compound and an organic-soluble organometallic compound. The lamellar phase may include at least 100,000 lamellar units and thus may include at least 100,000 nanoreactors.

Another embodiment is a lamellar phase having multiple nanoreactors, each nanoreactor being an interface between a water layer (of the lamellar phase) and an organic layer (of the lamellar phase). In operation, the nanoreactors react a first chemical reagent that is water soluble with a second chemical reagent that is organic soluble to form Janus metal-oxide nanoparticles at the interface. A hydrophilic surface of the Janus nanoparticles resides in the water layer. A hydrophobic surface of the Janus nanoparticles resides in the organic layer. The lamellar phase has multiple water layers and multiple organic layers. A thickness of each water layer in the lamellar phase may be less than 25 nm. A thickness of each organic layer in the lamellar phase may be less than 30 nm.

Yet another embodiment is a method of synthesizing Janus nanoparticles, such as Janus metal-oxide nanoparticles. The Janus nanoparticles may have a hydrophobic surface and a hydrophilic surface. The method includes forming a lamellar phase having water layers, organic layers, and a surfactant. A molecule of the surfactant may have a hydrophilic head contacting a water layer and a hydrophobic tail contacting an organic layer adjacent the water layer. The method includes reacting chemical precursors (for example, organometallic compounds) in the lamellar phase to form Janus nanoparticles at interfaces of the water layers with the organic layers. The reacting of the chemical precursors may involve reacting at the interfaces a first chemical precursor (for example, a water-soluble organometallic compound) incorporated in the water layers with a second chemical precursor (for example, an oil-soluble organometallic compound) incorporated in the organic layers. The forming of the lamellar phase and the reacting of the chemical precursors to form the Janus nanoparticles may be a one-pot synthesis.

The reacting of the chemical precursors may give a surface functional group (for example, an amine group or a thiol group) on a surface of at least one Janus nanoparticle of the Janus nanoparticles. The surface functional group may be, for example, an alkyl —$C_nH_{2n+1}CH_3$ group, an amine —$NH_2$ group, a thiol —SH group, a carboxyl —COOH group, or an isothiolcyanate —NCS group. The method may include reacting a molecule functional group of a molecule with the surface functional group in presence of a reagent to attach the molecule to the surface of the Janus nanoparticle. The molecule functional group may include, for example, an amine group, a thiol group, a hydroxyl group, a carboxyl group, or an isothiocyanate group, or any combinations thereof. The reagent may include, for example, 1-ethyl-3-(3-dimethylaminopropyl) carbodiimide hydrochloride (EDC), succinimidyl ester (NHS), succinimidyliodoacetate (SIA), N-succinimidyl 3-(2-pyridyldithio) propionate (SPDP), succinic anhydride, or thionyl chloride ($SOCl_2$), or any combinations thereof.

Yet another embodiment is a method of synthesizing Janus nanoparticles, comprising forming a lamellar phase having a surfactant, water layers, and organic layers. The water layers may be at least 100,000 water layers each having a thickness less than 50 nm. The organic layers may be at least 100,000 organic layers each having a thickness less than 50 nm. The forming of the lamellar phase includes incorporating a first chemical reagent in the water layers and incorporating a second chemical reagent in the organic layers. The method includes allowing the first chemical reagent to react with the second chemical reagent at interfaces of the water layers with the organic layers to form Janus nanoparticles (for example, Janus ceramic nanoparticles) at the interfaces. A hydrophilic surface of a Janus nanoparticle of the Janus nanoparticles may reside in a water layer. A hydrophobic surface of the Janus nanoparticle may reside in an organic layer adjacent the water layer. The forming of the lamellar phase and allowing the first chemical reagent to react with the second chemical reagent may occur in the same vessel.

Yet another embodiment is a method of synthesizing Janus nanomaterial. The method includes forming a lamellar phase having a surfactant, water layers, organic layers (for example, oil layers), and chemical precursors. The method includes allowing the chemical precursors to react to form Janus nanoparticles at interfaces between the organic layers and the water layers. A hydrophobic portion of the Janus nanoparticles may reside in the organic layers. A hydrophilic portion of the Janus nanoparticles may reside in the water layers. For instance, a hydrophobic portion of a Janus nanoparticle of the Janus nanoparticles may reside in an organic layer of the organic layers. A hydrophilic portion of the Janus nanoparticle may reside in a water layer of the water layers and where the organic layer is adjacent the water layer. The Janus nanoparticles may be, for example, Janus silicon-dioxide ($SiO_2$) nanoparticles, titanium-dioxide ($TiO_2$) nanoparticles, or zirconium-dioxide ($ZrO_2$) nanoparticles, or any combinations thereof.

The chemical precursors may include a first chemical precursor and a second chemical precursor. The first chemical precursor may be a water-soluble chemical reagent. The second chemical precursor may be an oil-soluble chemical reagent. The allowing of the chemical precursors to react may involve the first chemical precursor reacting with the second chemical precursor. In implementations, the first chemical precursor has a functional group and where the first chemical precursor reacting with the second chemical precursor gives the functional group as a surface functional group on a hydrophilic side of a Janus nanoparticle of the Janus nanoparticles. The method may include collecting the Janus nanoparticle from the lamellar phase and reacting a compound functional group of a compound with the surface functional group to attach the compound to the hydrophilic side of the Janus nanoparticle. In implementations, the second chemical precursor may have a functional group and where the first chemical precursor reacting with the second chemical precursor gives the functional group as a surface functional group on a hydrophobic side of a Janus nanoparticle of the Janus nanoparticles. The method may include collecting the Janus nanoparticle from the lamellar phase and reacting a compound functional group of a compound with the surface functional group to attach the compound to the hydrophobic side of the Janus nanoparticle.

Yet another embodiment is a lamellar phase including surfactant, water layers having a water-soluble organometallic compound, and oil layers having an oil-soluble organometallic compound. The lamellar phase has Janus metal-oxide nanoparticles formed from reaction of the water-soluble organometallic compound with the oil-soluble organometallic compound at the interfaces of the water layers with the oil layers. The Janus metal-oxide nanoparticles are disposed at the interfaces. In implementations, a hydrophilic surface of a Janus metal-oxide nanoparticle of the Janus metal-oxide nanoparticles resides in a water layer and a hydrophobic surface of the Janus metal-oxide nanoparticle resides in an oil layer adjacent the water layer. The water layers may include at least 100,000 water layers. The oil layers may include at least 100,000 oil layers. The water layers may each have a thickness up to about 50 nm. The oil layers may each have a thickness up to about 50 nm.

A number of implementations have been described. Nevertheless, it will be understood that various modifications may be made without departing from the spirit and scope of the disclosure.

What is claimed is:

1. A lamellar phase comprising:
water layers comprising a water-soluble organometallic compound, wherein the water layers each comprise a thickness up to about 50 nanometers (nm);
oil layers comprising an oil-soluble organometallic compound, wherein the oil layers each comprise a thickness up to about 50 nm;
a surfactant; and
Janus metal-oxide nanoparticles disposed at interfaces of the water layers with the oil layers, the Janus metal-oxide nanoparticles formed from reaction of the water-soluble organometallic compound with the oil-soluble organometallic compound at the interfaces, wherein a hydrophilic surface of a Janus metal-oxide nanoparticle of the Janus metal-oxide nanoparticles resides in a water layer, and wherein a hydrophobic surface of the Janus metal-oxide nanoparticle resides in an oil layer adjacent the water layer, the Janus metal-oxide nanoparticles functionalized with different functional groups of molecules, wherein the functional groups are attached to surfaces of the Janus metal-oxide nanoparticles via structure portions of a reagent comprising 1-ethyl-3-(3-dimethylaminopropyl) carbodiimide hydrochloride (EDC), succinimidyl ester (NHS), succinimidyliodoacetate (SIA), N-succinimidyl 3-(2-pyridyldithio) propionate (SPDP), succinic anhydride, and thionyl chloride (SOCl2) or any combinations thereof.

2. The lamellar phase of claim 1, wherein the water layers comprise at least 100,000 water layers, wherein the oil layers comprise at least 100,000 oil layers.

3. The lamellar phase of claim 1, wherein the different functional groups comprise a surface functional group comprising an alkyl group (—CnH2n+1CH3 group), an amine group (—NH2 group), a thiol group (—SH group), a carboxyl group (—COOH group) or an isothiolcyanate group (—NCS group).

4. The lamellar phase of claim 1, where the molecules comprise functional groups comprising an amine group, a thiol group, a hydroxyl group, a carboxyl group or an isothiocyanate group, or any combinations thereof.

5. The lamellar phase of claim 3, wherein the surface functional group comprises an amine group or a thiol group.

6. The lamellar phase of claim 1, wherein the water layers each comprise a thickness of 5 nm to 10 nm.

7. The lamellar phase of claim 1, wherein the oil layers each comprise a thickness of 2 nm to 15 nm.

8. The lamellar phase of claim 1, wherein the Janus metal-oxide nanoparticles are rod-like particles having a diameter of about 30 nm and a length of about 200 nm.

9. The lamellar phase of claim 1, wherein the Janus metal-oxide nanoparticles are spherical particles having a diameter of about 30 nm to 50 nm.

* * * * *

UNITED STATES PATENT AND TRADEMARK OFFICE
CERTIFICATE OF CORRECTION

PATENT NO. : 12,195,343 B2  
APPLICATION NO. : 18/106342  
DATED : January 14, 2025  
INVENTOR(S) : Wei Wang Page 1 of 1

It is certified that error appears in the above-identified patent and that said Letters Patent is hereby corrected as shown below:

In the Claims

In Column 18, Line 12, Claim 3, please replace "isothiolcyanate" with -- isothiocyanate --.

Signed and Sealed this  
Eleventh Day of March, 2025

Coke Morgan Stewart  
*Acting Director of the United States Patent and Trademark Office*